United States Patent

[11] 3,611,088

| [72] | Inventors | Warren R. Hill<br>Dearborn;<br>John R. Madsen, Mount Clemens, both of Mich. |
|---|---|---|
| [21] | Appl. No. | 877,622 |
| [22] | Filed | Nov. 18, 1969 |
| [45] | Patented | Oct. 5, 1971 |
| [73] | Assignee | The Detroit Edison Company<br>Detroit, Mich. |

[54] MULTIPLE SPEED INVERSE PARALLEL CONNECTED SILICON CONTROLLED RECTIFIER MOTOR CONTACTOR STRUCTURE
6 Claims, 4 Drawing Figs.

[52] U.S. Cl. .................................................. 318/227, 318/345
[51] Int. Cl. .................................................. H02p 5/40
[50] Field of Search ........................................... 318/224, 225, 227, 345; 307/252

[56] References Cited
UNITED STATES PATENTS

| 2,722,649 | 11/1955 | Immel et al. ................ | 318/227 X |
| 2,941,138 | 6/1960 | Ramer ........................... | 318/225 X |
| 3,223,911 | 12/1965 | Seiler et al. .................. | 318/345 X |
| 3,346,795 | 10/1967 | Linke ............................. | 318/227 |
| 3,436,645 | 4/1969 | Johnson et al. ................ | 318/227 X |

OTHER REFERENCES

SCR Manual, General Electric, 4th Ed. (1967), pp. 326–330

Primary Examiner—Gene Z. Rubinson
Attorney—Whittemore, Hulbert & Belknap

ABSTRACT: Solid-state motor contactor structure including a pair of inverse parallel connected silicon controlled rectifiers having gate electrodes shorted together through relay contacts and a thyrector voltage surge protector connected in parallel with the silicon controlled rectifiers. The solid-state contactor structure is adapted to be inserted in series in each phase of a multiple phase electrical motor in each winding thereof. Separate control structure is provided for actuating the solid-state contactor structure for alternatively energizing the contactor structure in either a slow speed motor winding or a high-speed motor winding and positively preventing energizing of the motor contactor structure in the other motor winding.

PATENTED OCT 5 1971 3,611,088

INVENTORS.
JOHN R. MADSEN
WARREN R. HILL
BY Whittemore
Hulbert & Belknap ATTORNEYS 3,611,088

MULTIPLE SPEED INVERSE PARALLEL CONNECTED SILICON CONTROLLED RECTIFIER MOTOR CONTACTOR STRUCTURE

BACKGROUND OF THE INVENTION

1. Field of the Invention

The invention relates to electric motor control and refers more specifically to solid-state contactor structure for controlling the electrical energy passed through each phase of three-phase low speed motor windings and three-phase high speed motor windings alternatively.

2. Description of the Prior Art

In the past, motor contactors for coal mill feeder motors and the like have been mechanical devices which have been required to operate repeatedly. Such mechanical devices have a short life and have in the past been high-maintenance items due to the large quantity of electrical energy passing therethrough and the repeated operation thereof.

SUMMARY OF THE INVENTION

In accordance with the invention, there is provided solid-state motor contactor structure comprising inverse parallel connected silicon controlled rectifiers having controller actuated means for shorting the gate electrodes thereof together and which are connected in series in each phase of each winding of a three-phase motor having both low-speed and high-speed windings. The associated controller includes means for simultaneously shorting the control electrodes of each of the contactor structures in each phase of either the low- or high-speed winding of the motor alternatively and for locking out the contactor structures in the phases of the other winding of the motor.

DESCRIPTION OF THE PREFERRED EMBODIMENTS

Figure 1:
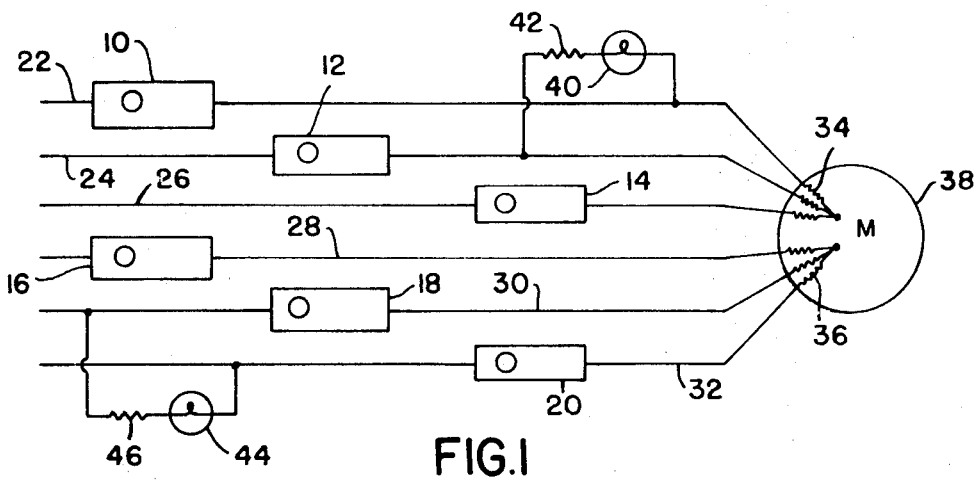
FIG. 1 is a partly block and partly schematic diagram of a three-phase electric motor having a low-speed winding and a high-speed winding with solid-state contactor structure constructed in accordance with the invention in each phase of each winding.

As shown best in FIG. 1, solid-state contactor structure 10, 12, 14 and 16, 18 and 20 is provided in each of the conductors 22, 24 and 26 and conductors 28, 30 and 32 of the three-phase low speed winding 34 and the three-phase high speed winding 36 of the electric motor 38 for controlling the operation of the motor 38.

A low-speed winding light 40 is provided in series with current limiting resistance 42 across two phases of the three-phase low speed motor winding 34 for indicating when the low-speed motor winding 34 is energized. Similarly, a high-speed winding light 44 is provided in series with a resistance 46 across two phases of the high-speed motor winding 36 to indicate when the high-speed motor winding 36 is energized.

Figure 3:
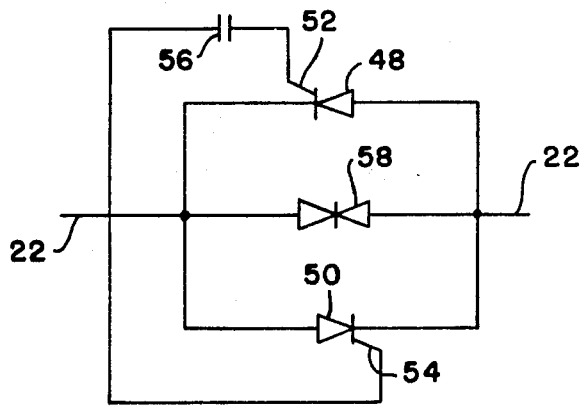
FIG. 3 is a schematic diagram of contactor structure for use in each phase of the low-speed winding of the motor illustrated in FIG. 1.

Each of the solid-state contact structures 10, 12 and 14 in the conductors 22, 24 and 26 energizing the low-speed motor winding 34 are constructed as illustrated best in FIG. 3. The solid-state motor contactor structure of FIG. 3 includes a pair of inverse parallel connected silicon controlled rectifiers 48 and 50 having control electrodes 52 and 54 which are shorted through normally open relay contacts 56. A thyrector diode 58 is connected in parallel with the silicon controlled rectifiers 48 and 50 for suppressing voltage surges which might otherwise damage the silicon controlled rectifiers.

In operation of the solid-state contactor structure illustrated in FIG. 3, with an alternating signal appearing on the input conductor which may be, for example, conductor 22, which signal will be one phase of three-phase electrical energy for energizing the low-speed winding 34 of the motor 38, one of the silicon controlled rectifiers 48 and 54 will be energized on closing of the relay contacts 56 depending on the polarity of the alternating signal on the input conductor at the time of closing of the contacts 56.

If the silicon controlled rectifier 48 has fired on closing of the relay contacts 56, a signal will be conducted through the silicon controlled rectifier 48 until the polarity of the alternating signal changes, at which time the leakage signal from the silicon controlled rectifier 48, which will be turned off by the polarity reversal thereacross, will provide a signal on the gate 54 of the silicon controlled rectifier 50 sufficient to turn the silicon controlled rectifier 50 on. The silicon controlled rectifier 50 will then conduct during the opposite polarity half-cycle of the alternating signal on the input conductor after which the polarity of the alternating signal will again reverse and the leakage voltage from the rectifier 50 will cause the rectifier 48 to fire again and conduct to start another cycle of operation of the contactor structure.

Any voltage surges higher than the breakover voltage of the thyrector 58 will be suppressed by the thyrector 58 so that damage to the silicon controlled rectifiers 48 and 50 is limited.

Figure 4:
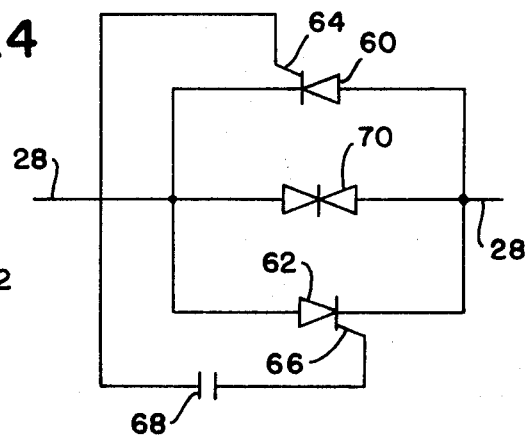
FIG. 4 is a schematic diagram of a contactor structure for use in each phase of the high-speed winding of the motor illustrated in FIG. 1.

Each of the contactor structures 16, 18 and 20 in the conductors 28, 20 and 32 feeding the separate phases of the alternating electrical input signal to the high-speed winding of the three-phase motor 38 are best shown in FIG. 4. Each of the contactor structures 16, 18 and 20 include inverse parallel connected rectifiers 60 and 62 having control electrodes 64 and 66 connected together through the relay contacts 68. Again, a surge-suppressing thyrector diode 70 is connected in parallel with the silicon controlled rectifiers 60 and 62 to protect them from overvoltage.

The operation of the contactor structure of FIG. 4 on closing of the relay contacts 68 and with an alternating input voltage on, for example, conductor 28 is in all respects similar to the operation of the contactor structure illustrated in FIG. 3 as described above.

Figure 2:
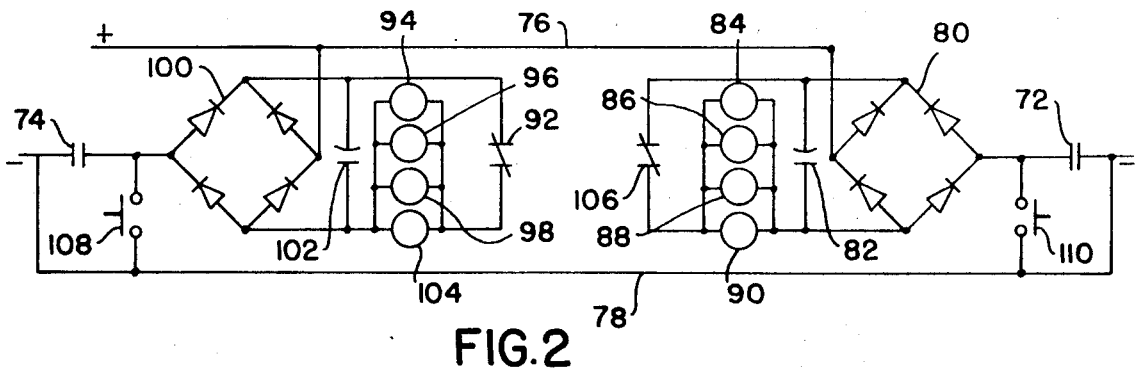
FIG. 2 is a schematic drawing of controller structure for the contactor structure illustrated in FIG. 1.

The controller structure for the motor 38 of FIG. 2 includes the low-speed controller contacts 72 and the high-speed controller contacts 74. When it is desired to actuate the motor 38 through the low-speed winding 34, the contacts 72 are closed from a master controller. Similarly, when it is desired to control the motor 38 through the high-speed winding 36, the contacts 74 are closed.

On closing of the contacts 72, the alternating signal present between the conductors 76 and 78 is impressed across the full wave solid-state rectifier 80, the output of which is filtered in the capacitor 82 to provide direct current operating voltage for the relay coils 84, 86 and 88, each of which are associated with contacts such as contact 56 in contactor structures 10, 12 and 14 and are operable to close the contacts 56 on being energized to produce the above indicated operation of the contactor structures 10, 12 and 14 to permit energizing of the low-speed three-phase motor winding 34, and indication of such operation by the light 40.

At the same time that the relay coils 84, 86 and 88 are energized, the relay coil 90 is energized to open the associated normally closed contacts 92 to prevent energizing of the high-speed winding 36 of the motor 38 simultaneously with energizing the low-speed winding of the motor 34.

Similarly, on closing of the contacts 74 by an energized relay coil in a master controller circuit, the relay coils 94, 96 and 98 are energized through the rectifier 100 and filter capacitor 102 to close contacts such as contact 68 in the solid-state contactor structures 16, 18 and 20 and thereby energize the high-speed three-phase motor winding 36.

Again, the relay coil 104 is also energized to open the normally closed associated contacts 106 and thus prevent energizing of the low-speed motor winding simultaneously with the energizing of the high-speed motor winding.

The pushbuttons 108 and 110 are actuated manually to energize the winding 34 or 36 of motor 38 as disclosed above for test purposes when desired.

Thus it will be seen that in the operation of the contactor structures of the invention, there are no mechanical contacts which must be opened and closed in the main conductors 22, 24, 26, 28, 30 or 32 to the two three-phase windings of the motor 38, the switching contacts 56 and 68 of the low-speed and high-speed contactor structures are required to switch only the leakage current of the silicon controlled rectifiers, and therefore have a substantially unlimited life. The solid-state motor contactor structures 10, 12, 14, 16, 18 and 20 should, therefore, be substantially maintenance free.

What we claim as our invention is:

1. Solid-state motor contactor structure including inverse positioned parallel connected silicon controlled rectifiers for positioning in series with each phase of an electric motor winding and means for selectively connecting the control electrodes of the silicon controlled rectifiers directly to each other whereby on application of an alternating signal to the motor contactor structure when the control electrodes of the inverse positioned parallel connected silicon controlled rectifiers are connected together initially one of the rectifiers will conduct until the completion of the initial half-cycle of the applied alternating signal and will thereafter be rendered nonconducting by the opposite polarity next half-cycle of the alternating signal and the leakage current through the one silicon controlled rectifier will turn on the other silicon controlled rectifier and cause conduction thereof for said next half-cycle of the applied alternating signal and the cycling of the rectifiers is repeated indefinitely until the applied alternating signal is stopped or the direct connection between the control electrodes of the rectifiers is broken.

2. Structure as set forth in claim 1 and further including means for protecting the inverse positioned parallel connected silicon controlled rectifiers from surges of electrical energy comprising a thyrector connected in parallel with the silicon controlled rectifiers.

3. A three-phase motor including three motor phase windings and separate solid-state motor contactor structure connected in series with each of the motor phase windings, each including a pair of inversely positioned parallel connected silicon controlled rectifiers having control electrodes, means for selectively directly connecting the control electrodes of the silicon controlled rectifiers to each other whereby on application of an alternating signal in series with the motor contactor structure one silicon controlled rectifier is caused to conduct immediately for the remaining portion of the initial half-cycle of the applied alternating signal, the one silicon controlled rectifier is caused to cease conducting by the next half-cycle of the applied alternating signal and the leakage signal through the one silicon controlled rectifier initiates conduction through the other silicon controlled rectifier for the remainder of the next half-cycle of the applied alternating electrical signal and the procedure is repeated until the applied alternating signal is removed from the contactor structure or the control electrodes of the silicon controlled rectifiers are disconnected.

4. Structure as set forth in claim 3 and further including a thyrector connected in parallel with the silicon controlled rectifiers in each motor contactor structure for protecting the silicon controlled rectifiers from surges of electrical energy.

5. Structure as set forth in claim 3 wherein the motor is a multispeed motor including separate motor speed, three-phase motor windings for each speed thereof and the separate solid-state motor contactor structures are connected in series with each of the motor phase windings of each motor speed winding.

6. Structure as set forth in claim 5 and further including a control circuit operably connected to the means for selectively directly connecting the control electrodes of each of the inversely positioned parallel connected pairs of silicon controlled rectifiers each including a source of alternating electrical energy, a rectifier, means for selectively connecting the rectifier across the source of alternating electrical energy, filter means for filtering the output signal from the rectifier, three parallel connected relay coils connected across the output of the rectifier and filter for energization thereby, relay contacts associated with each of the relay coils for closing on energizing of the relay coils connected between the control electrodes of the pairs of silicon controlled rectifiers, a separate relay coil connected in parallel with the three relay coils and a normally closed relay contact operably connected to the separate relay coil of another control circuit for opening thereby on energization of the separate relay coil connected in the other circuit connected in series with the parallel connected relay coils whereby on connecting the rectifier across the source of alternating electrical energy the three relay coils are energized through the normally closed relay contact and all of the other speed windings of the motor are deenergized by opening of the normally closed relay contacts in each of the other control circuits.